(12) United States Patent
Fondeur

(10) Patent No.: US 6,526,202 B1
(45) Date of Patent: Feb. 25, 2003

(54) GRATING WAVEGUIDE CONFIGURATION FOR PHASARS

(75) Inventor: Barthelemy Fondeur, Bourg la Reine (FR)

(73) Assignee: Coring Incorporated, Corning, NY (US)

( * ) Notice: Subject to any disclaimer, the term of this patent is extended or adjusted under 35 U.S.C. 154(b) by 0 days.

(21) Appl. No.: 09/639,837

(22) Filed: Aug. 16, 2000

(30) Foreign Application Priority Data

Oct. 29, 1999 (FR) ............................................. 99 13619

(51) Int. Cl.[7] ................................................ G02B 6/34
(52) U.S. Cl. .............................. 385/37; 385/31; 385/46
(58) Field of Search .............................. 385/37, 31, 15, 385/24, 46

(56) References Cited

U.S. PATENT DOCUMENTS

| | | |
|---|---|---|
| 5,243,672 A | 9/1993 | Dragone |
| 5,745,616 A | 4/1998 | Zirngibl |
| 5,793,907 A * | 8/1998 | Jalali et al. .................. 359/130 |
| 5,943,452 A * | 8/1999 | Himeno et al. ............... 385/14 |
| 5,986,782 A | 11/1999 | Alexander et al. |
| 6,005,694 A | 12/1999 | Liu |
| 6,049,640 A * | 4/2000 | Doerr ........................... 385/15 |

FOREIGN PATENT DOCUMENTS

| | | |
|---|---|---|
| EP | 0 639 782 A1 | 8/1994 |
| WO | WO 98 04944 A | 5/1998 |

OTHER PUBLICATIONS

J. Sarathy, et al., "Polarization Insensitive Waveguide Grating Routers in INP"; IEEE Photonics Technology Letters, US, IEEE Inc. New York, vol. 10, No. 12, Dec. 1998; pp. 1763–1765, XP00802172 ISSN: 1041–1135.

M. Smit, et al., "Photonic Integrated Circuits For Advanced Communication Networks"; International Journal of Optoelectronics (Incl. Optical Computing & Processing), GB, Taylor & Francis, London, vol. 12, No. 1, 1998, pp. 25–30, XP000774118 ISSN: 0952–5432.

L.O. Lierstuen, et al., "8–Channel Waveguide Division Multiplexer Based on Multimode Interference Couplers"; IEEE Photonics Technology Letters, US, IEEE Inc. New York, vol. 7, No. 9, Sep. 1, 1995, pp. 1034–1036, XP000527511 ISSN: 1041–1135.

Masao Kawachi, Tutorial Review—Silica Waveguides on Silicon and Their Application to Integrated–Optic Components, 1990, pp. 391–416.

* cited by examiner

*Primary Examiner*—Rodney Bovernick
*Assistant Examiner*—Sung Pak
(74) *Attorney, Agent, or Firm*—James V. Suggs

(57) ABSTRACT

A grating is provided having a generally s-shaped waveguide configuration. The grating includes a plurality of waveguides arranged adjacent to one another to form an array. The array includes a first portion bending in a counter-clockwise direction, a second portion bending in a clockwise direction, and a third portion extending in a straight direction. The arc length of each waveguide along the counter-clockwise bend portion varies from one waveguide to the next. At its minimum, the arc length is nearly zero. The different arc lengths along the counter-clockwise bend cause some waveguides to be longer than others. This results in a clear separation of the individual waveguides. Further, the overall dimension of the grating is smaller than conventional devices which leads to reduced cross-talk.

11 Claims, 5 Drawing Sheets

GRATING WAVEGUIDE CONFIGURATION FOR PHASARS

BACKGROUND OF THE INVENTION

1. Technical Field

The present invention generally relates to wavelength division multiplexing systems and, more particularly, to an improved grating configuration for a phasar.

2. Technical Background

The simultaneous transmission of several channels along a single path is known as wavelength division multiplexing. This technology is important in fiber based systems due to its impact on system configuration, performance and cost. One major advantage of this technology is its ability to increase system capacity by increasing the number of channels that can be carried per fiber. With the ability to increase capacity, existing systems can be upgraded rather than replaced.

In wavelength division multiplexing systems, each channel operates at a different wavelength. The individual wavelengths are combined into a single path by a multiplexer and are separated from one another by a demultiplexer. Multiplexers and demultiplexers normally take the form of a dispersive element such as a diffraction grating, prism, or hologram. When using a grating, demultiplexing is accomplished by transmitting the multiplexed signal through the grating which separates the individual wavelengths from one another and diffracts each in a slightly different direction. Multiplexing is accomplished by utilizing the same device in reverse.

As wavelength division multiplexing technology has evolved, the need for more complex photonic components such as gain-flattening filters, variable attenuators, and add-drop multiplexers has increased. An efficient way to package such components is to use a planar photonic device. Planar photonic devices are chosen for their ability to implement many optical functions on a common wafer. In addition, active devices can be added to the wafer in order to create hybrid packages delivering many of the functions (e.g., switching, attenuating, monitoring, multiplexing and demultiplexing, etc.) needed in optical networks in very compact packages.

When combining many different elements on the same wafer, noise or cross-talk generated by each element sometimes interferes with the other elements. This greatly decreases the performance of the overall system. Cross-talk is an especially critical consideration in phasars for dense wavelength division multiplexing applications where more and more signals with different wavelengths travel through the network. Each wavelength must be correctly routed to the correct detector or fiber, and must not interfere with the other wavelengths.

Other requirements for phasars have also increased dramatically in the last decade. In addition to having less cross-talk, phasars must have better insertion losses, work with a greater number of channels, and have denser spectral spacing. These specifications have resulted in the development of larger and larger devices. Since cross-talk is dependent on the length traveled in phasars, such larger devices are more sensitive to cross-talk. In the case of refractive index, core layer, or etching non-uniformity in the wafer, the accumulated phase error along each grating waveguide increases dramatically with length.

Conventional gratings for phasars include a plurality of adjacently arranged waveguides forming an array. The array of waveguides includes a first portion extending in a straight direction, a second portion bending in a clockwise direction, and a third portion extending in a straight direction. The second, clockwise bend portion has a fixed or variable radius of curvature bringing the direction of the array to the horizontal. This array is then repeated in a mirror image for the opposite side of the phasar.

Although such conventional grating configurations have achieved great success, there is room for improvement in the art. For example, the first straight portion of the grating forces wavelengths to travel a longer distance than is necessary thereby increasing the potential for cross-talk interference. As such, it would be desirable to provide a compact grating configuration for reducing cross-talk interference in wavelength division multiplexing systems by decreasing the distances that wavelengths must travel.

SUMMARY OF THE INVENTION

The above and other objects are provided by a grating having a generally s-shaped waveguide configuration. The grating includes a plurality of waveguides arranged adjacent to one another to form an array. The array includes a first portion bending in a counter-clockwise direction, a second portion bending in a clockwise direction, and a third portion extending in a straight direction. The bends have either a fixed or a variable radius of curvature. The arc length of each waveguide along the counter-clockwise bend portion varies from one waveguide to the next. The arc length of the first counter-clockwise bend is nearly zero. The different arc lengths along the counter-clockwise bend cause some waveguides to be longer than others. This results in a clear separation of the individual waveguides. Further, the overall dimension of the grating is smaller than conventional devices which leads to reduced cross-talk.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 6A is schematic illustration of a preferred embodiment grating for the phasar of FIG. 1;

FIG. 6B is another schematic illustration of a preferred embodiment grating for the phasar of FIG. 1;

DETAILED DESCRIPTION OF THE PREFERRED EMBODIMENTS

The present invention is directed towards a waveguide multiplexing system including a grating having an s-shaped waveguide configuration. The grating includes a plurality of waveguides arranged adjacent to one another to form an array. Each half of the array includes a first portion forming a counter-clockwise bend. The arc length of each waveguide along the first portion varies from the first waveguide in the array to the last. This grating configuration improves upon known gratings by reducing the total distance that all wavelengths must travel. This reduces the potential for cross-talk and increases efficiency.

Figure 1:
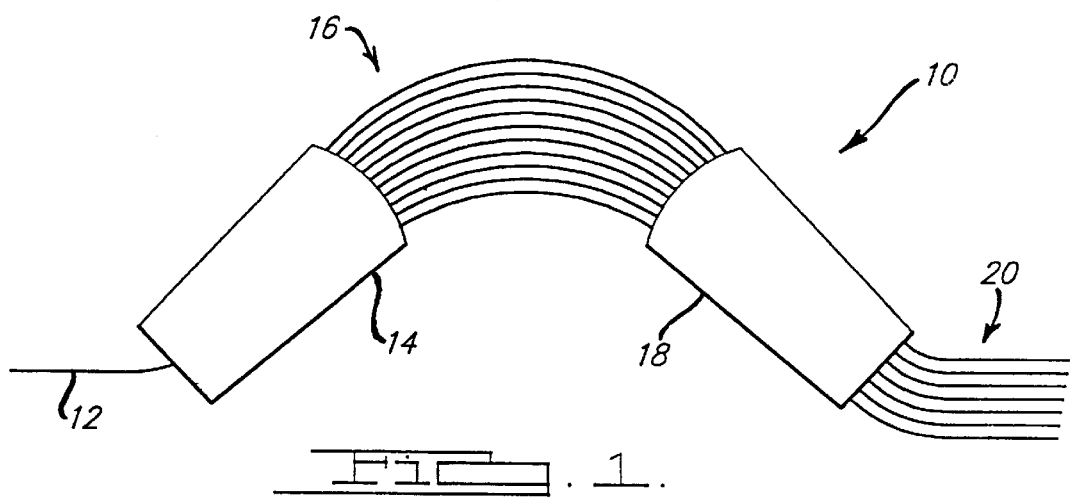
FIG. 1 is a schematic illustration of a phasar for a wavelength division multiplexing system including a grating in accordance with the present invention.

Turning now to the drawing figures, FIG. 1 illustrates a phasar 10 for use in a wavelength division multiplexing system. Although phasar 10 is illustrated, it is to be understood that this environment is merely exemplary of the type of system in which the grating of the present invention could be employed.

The phasar 10 is preferably formed in a single planar wafer of glass and includes an input waveguide 12 coupled to an input slab 14 so as to optically communicate therewith. The input slab 14 is coupled to a grating 16 which is coupled to an output slab 18. The grating 16 enables optical communication between the input slab 14 and output slab 18. The output slab 18 is coupled to an output waveguide array 20 so as to optically communicate therewith. Preferably, the input waveguide 12, input slab 14, grating 16, output slab 18 and output waveguide array 20 are formed by reactive ion etching through a photolithography process.

Figure 2:
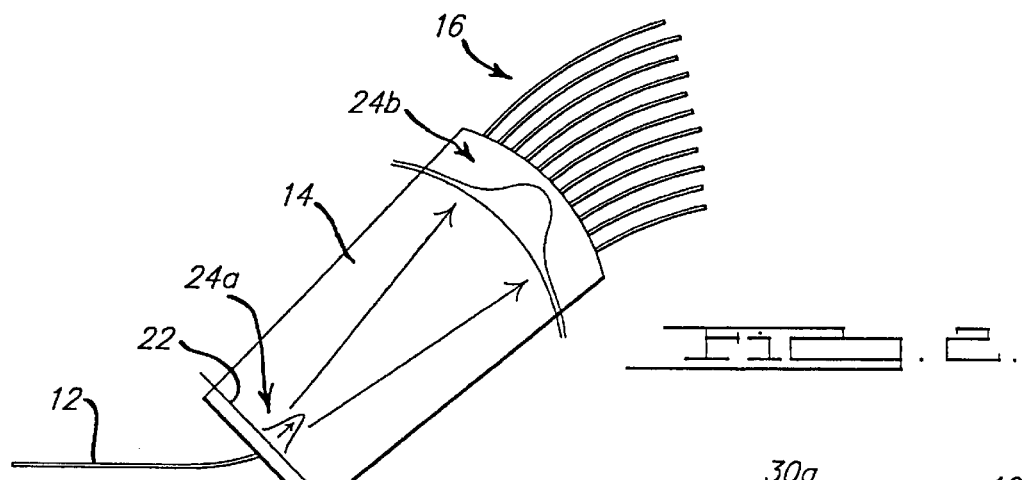
FIG. 2 is a more detailed view of the input waveguide and input slab of FIG. 1.
Figure 3:
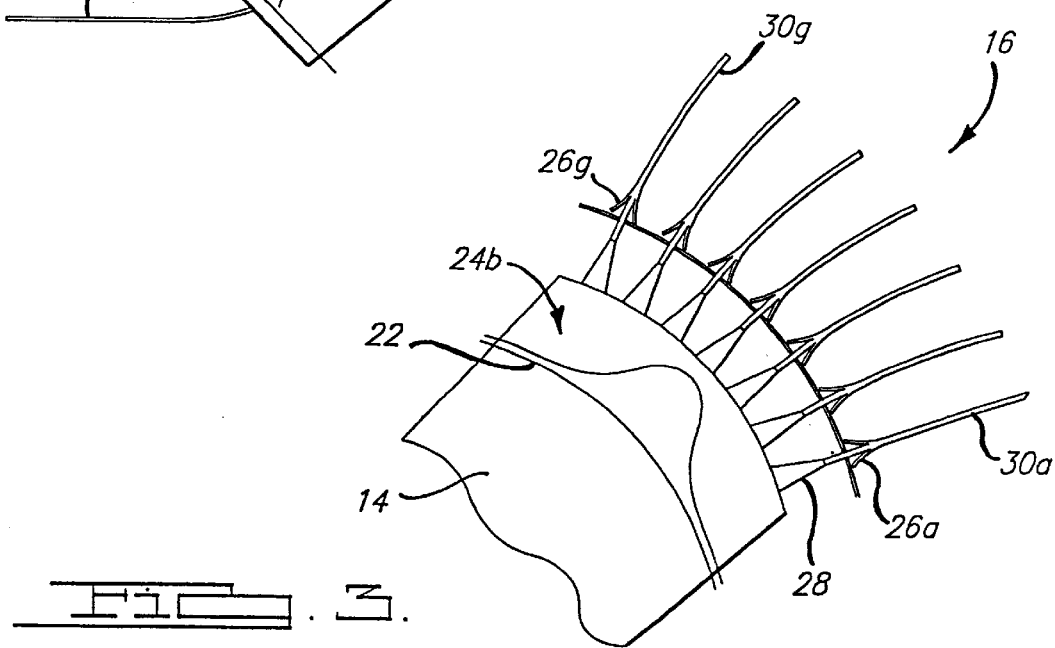
FIG. 3 is a more detailed view of the input slab of FIG. 2.

Referring now to FIG. 2, a more detailed view of the input waveguide 12 and input slab 14 of FIG. 1 is illustrated. The input waveguide 12 delivers a multiplexed signal 22 to the input slab 14. The trapezoidal input slab 14 diffracts the multiplex signal 22 along its length such that the signal's E-field changes from a narrow profile 24a to a broad profile 24b. As illustrated in FIG. 3, after diffracting, the broad profile E-field 24b splits into individual narrow profile E-fields or modes wavelengths 26a–g which enter the grating 16. A plurality of funnels 28 on the input slab 14 help to split the broad profile E-field 24b into the separate waveguides 30a–g in the grating 16 with minimal energy loss.

Figure 4:
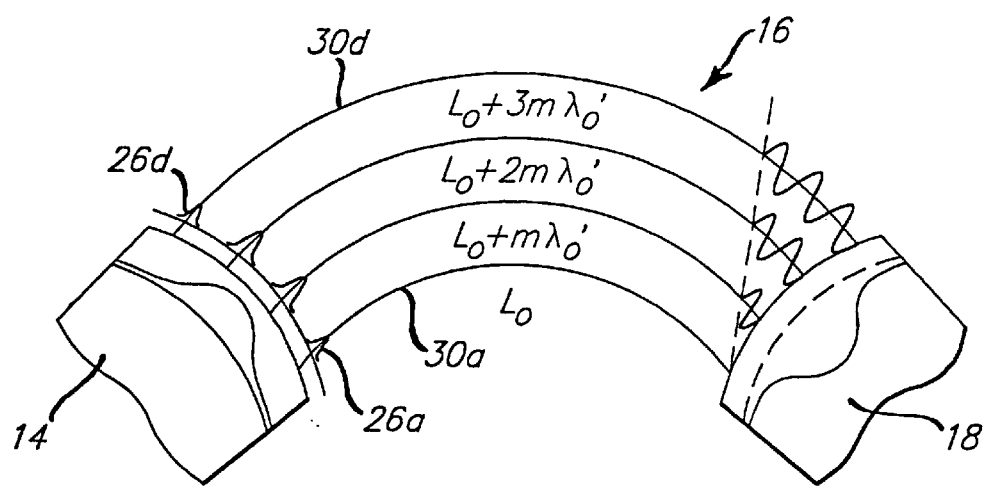
FIG. 4 is a more detailed view of the grating of FIG. 1.
Figure 5:
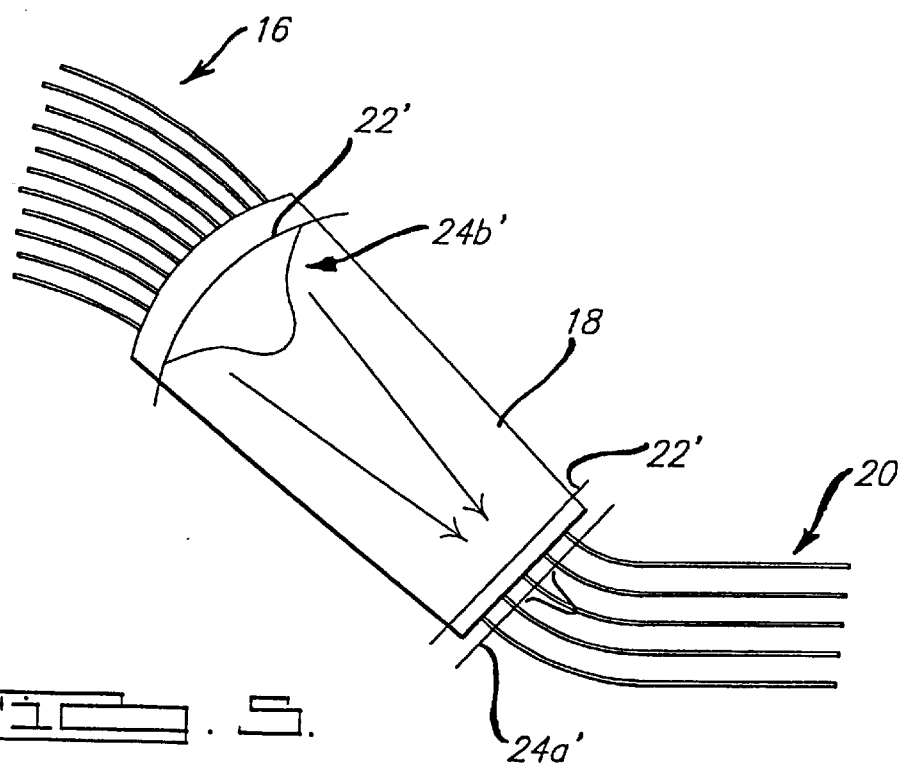
FIG. 5 is a more detailed view of the output slab and output waveguide array of FIG. 1.
Figure 5A:
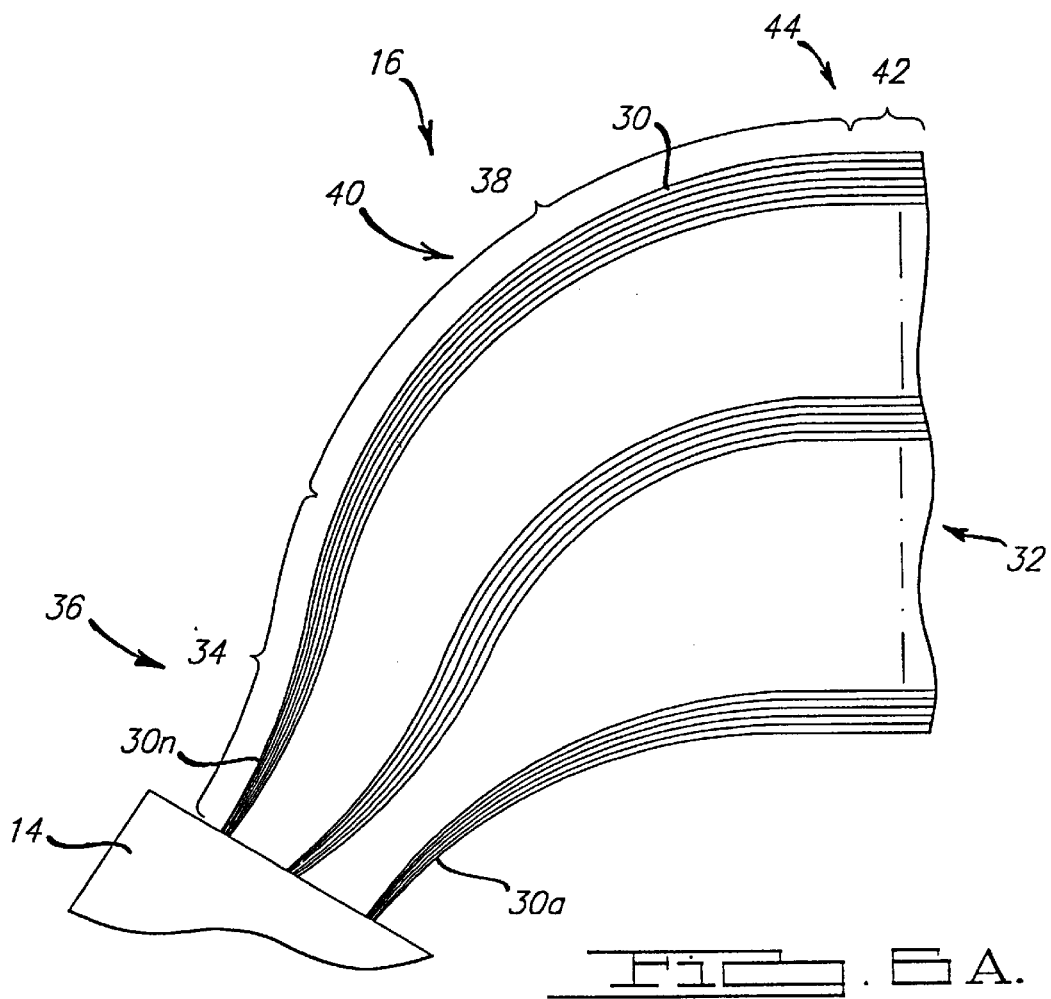
Figure 5B:
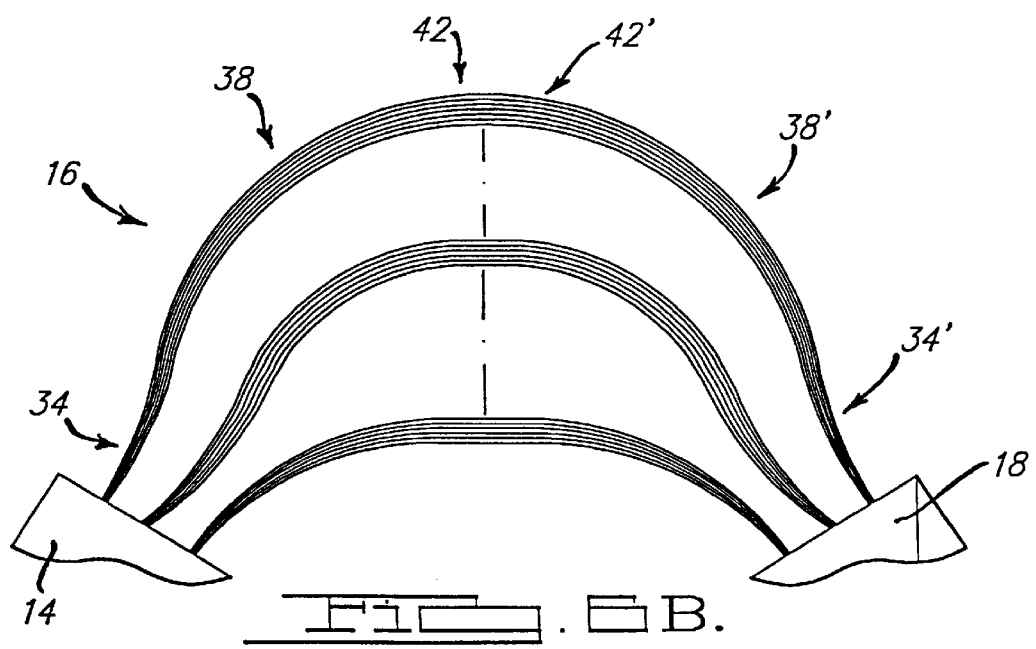

Turning now to FIG. 4, a more detailed view of the grating of FIG. 1 is illustrated. After exiting the input slab 14, the modes 26a–d travel along the waveguides 30a–d to the output slab 18. The length of each waveguide 30a–d is selected such that the modes 26a–d arrive at the output slab 18 in phase for a specific wavelength. As described in greater detail below, a constant length increment is provided between consecutive waveguides 30a–d. Although not illustrated, a plurality of funnels interposed between the grating 16 and output slab 18 help direct the individual modes 26a–d therein. As shown in FIG. 5, the trapezoidal output slab 18 diffracts the signal 22' such that the modes 26a–d combine into a broad profile E-field 24b' which changes to the narrow profile E-field 24a'. The signal 22' is then delivered to the output waveguide array 20.

Referring now to FIG. 6A, a more detailed view of the first half of the grating 16 is illustrated. One skilled in the art will appreciate that the other half of the grating 16 has been omitted for simplicity of illustration. As shown in FIG. 6B, the second half of the grating 16 is the mirror opposite of the half illustrated in FIG. 6A. The purpose of the grating 16 is to direct the diffracted signal from the input slab 14 through different paths which vary in length thereby dividing the diffracted signal into a plurality of modes with a desired phase pattern.

The grating 16 includes a plurality of waveguides 30a–n (wherein n=the number of waveguides) formed adjacent one another so as to define an array 32. The array 32 includes a first arcuate portion 34 in the form of a counter-clockwise bend 36. The first arcuate portion 34 transitions into a second arcuate portion 38 in the form of a clockwise bend 40. As such, the second arcuate portion 38 curves opposite the first arcuate portion 34. The second arcuate portion 38 brings the array 32 to the horizontal. The second arcuate portion 38 transitions into a portion 42 in the form of a straight 44 which leads to the symmetry plane 46. As illustrated in FIG. 6B, the grating 16 continues beyond the symmetry plane 46 with a second straight portion 42', a third arcuate portion 38' in the form of a clockwise bend, and a fourth arcuate portion 34' in the form of a counter-clockwise bend which is coupled to the output slab 18.

The arc length of each individual waveguide 30a–n along the first arcuate portion 34 (and fourth arcuate portion 34')increases a constant amount from a minimum at the first waveguide 30a to a maximum at the last waveguide 30n. Preferably, the arc length of the first waveguide 30a along the first arcuate portion 34 is nearly zero. By incrementally increasing the arc length of consecutive waveguides 30a–n, the length of each waveguide 30a–n increases from a minimum at the first waveguide 30a to a maximum at the last waveguide 30n. This provides clear separation of individual modes propagating through the grating 16. Further, due to the s-shape of the grating 16 provided by the first arcuate portion 34, the overall dimension of the grating 16 is smaller than conventional designs. For example, in a 16 channel phasar at 100 GHz, a conventional grating configuration (i.e., straight/clockwise bend/straight) has a first grating arm length of 14,670 mm whereas the present grating configuration (i.e., counter-clockwise bend/clockwise bend/straight) has a first grating arm length of 13,772 mm. In a 40 channel phasar at 50 GHz, a conventional grating configuration has a first grating arm length of 13,645 mm whereas the present grating configuration has a first grating arm length of 12,729 mm. This compact configuration reduces cross-talk and increases efficiency. For instance, in the 16 channel comparison described above, the level of cross-talk was 8 dB better with the present grating configuration.

The efficiency of the grating 16 can be more completely understood from the following model. When light propagates through both symmetrical portions of the grating 16, its phase shift from the input slab 14 to the output slab 18 is equal to:

$$\text{Phase}[k] = \text{neff}[k](L_0 + kdl) \quad (1)$$

wherein:

k is the waveguide 30 for which the phase shift is being sought;

Phase[k] is the phase shift from the input slab 14 to the output slab 18 along waveguide 30k;

neff[k] is equal to the mean effective index in the waveguide 30k; and $(L_0+kdl)$ is equal to the length of the waveguide 30k.

Theoretically, neff[k] is uniform. In that case:

$$\text{neff}[k] = \text{neff}_0 \quad (2)$$

$$\text{Phase}[k] = \text{neff}_0 (L_0 + kdl) \quad (3)$$

The phase difference between two waveguides 30 is constant and equal to $$\text{Phase}[k] - \text{Phase}[k-1] = \text{neff}_0 dl \quad (4)$$

With process variations, the effective index varies from one waveguide 30 to another:

$$neff[k] = neff_0 + dneff[k] \tag{5}$$

Figure 7:
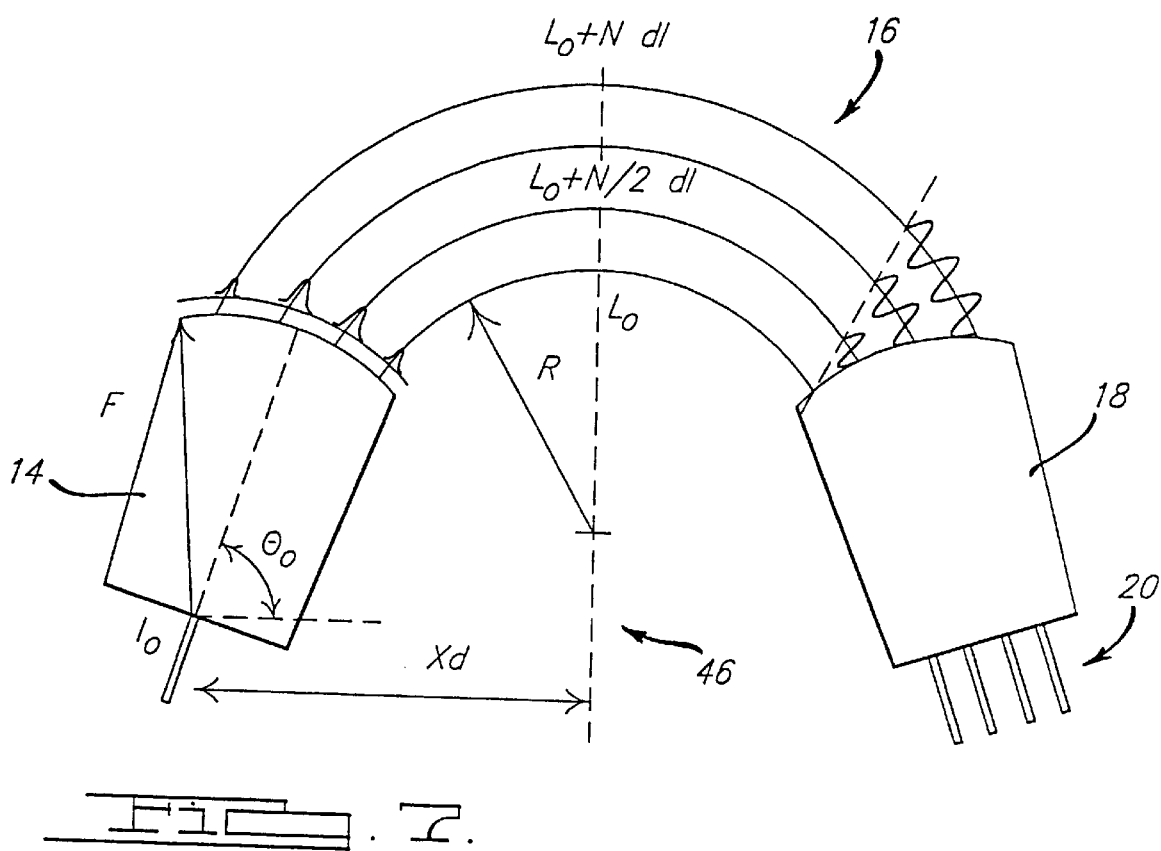
FIG. 7 is a schematic illustration of the phasar of FIG. 1 having dimensional reference symbols inserted therein.
Figure 8:
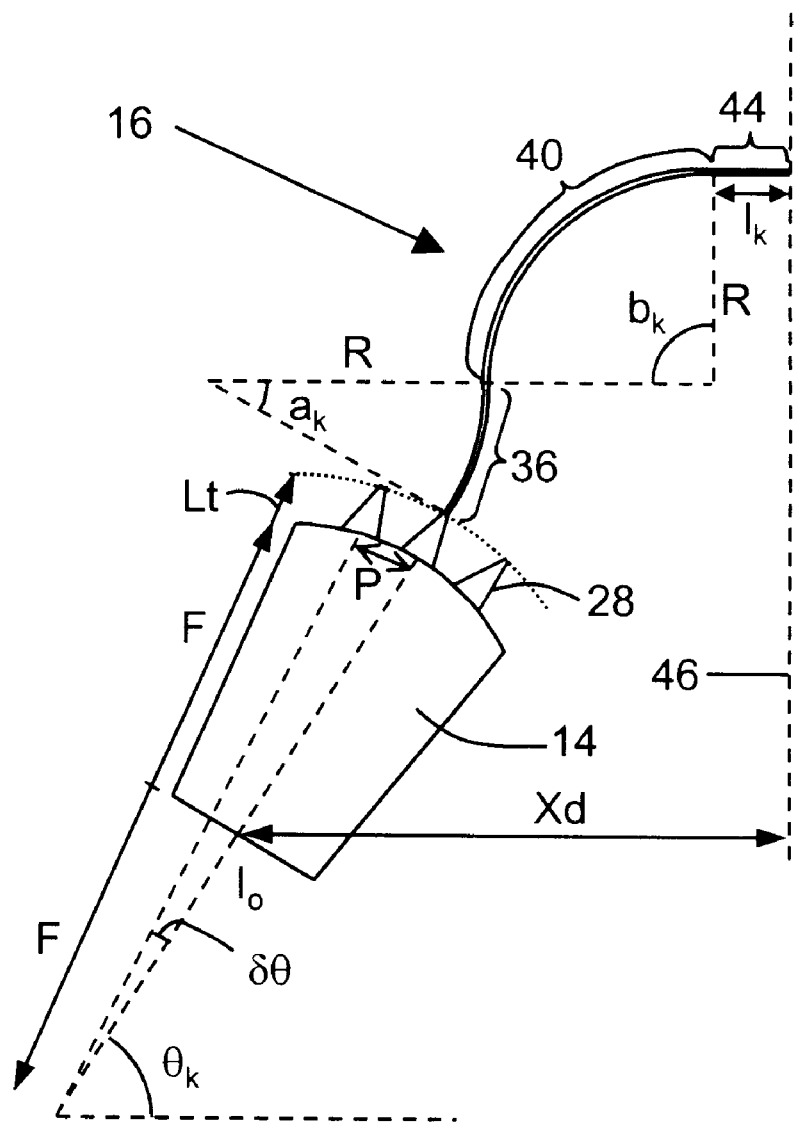
FIG. 8 is a schematic illustration of the input slab and a single waveguide of the phasar of FIG. 1 with dimensional reference symbols inserted therein.

The phase difference between two adjacent waveguides 30 is no longer constant. The phase errors are amplified for long $L_0$, and generate cross-talk in the spectral transmission of the phasar 10. The phase difference between two waveguides 30 and the phase increment variance becomes:

Referring now to FIGS. 7 and 8, an optimum s-bend grating configuration will be described. In FIG. 7, F is the length of the input slab 14, $I_o$ is the input origin of the input slab 14, Xd the distance between $I_o$ and the symmetry plane 46, R the bend radius, and $\theta_c$ the tilt angle of the input slab 14. The symmetrical part is repeated on the right side. In FIG. 8, Lt is the length of the funnels 28, $a_k$ the angle subtended by the counter-clockwise bend portion 36, $b_k$ the angle subtended by the clockwise bend portion 40, $l_k$ the length of the straight portion 44, and p the pitch between two waveguides 30.

As the phase errors are proportional to the length of the grating, the grating 16 is designed to reduce $L_0$ as much as possible.

To optimize the s-Bend configuration, a coordinate system is defined starting from $I_o$. The angle $\delta\theta$ between the initial directional angles of two adjacent grating waveguides 30 is fixed:

$$\delta\theta = \arctan\left(\frac{P}{2F}\right)$$

The initial directional angle of the waveguide 30k is equal to:

$$\theta_k = \theta_c + \left(k - \frac{n}{2}\right)\delta\theta$$

where n is the number of waveguides 30.

For a fixed slab orientation $\theta_c$ and a position of the symmetry plane Xd, the parameters $a_k$, $b_k$ and $l_k$ are calculated by solving the following set of three equations:

straight portion 44 perpendicular to symmetry plane 46;

$$b_k = \theta_k + a_k$$

straight portion 44 finishing on the symmetry plane 46; and $$Xd = (F+Lt)\cos(\theta_k) + R(\sin(\theta_k + a_k) - \sin(\theta_k) + \sin(b_k)) + l_k$$

path difference between two adjacent waveguides 30 equal to dl.

$$l_k + R(a_k + b_k) - l_{k-1} - R(a_{k-1} + b_{k-1}) = dl/2$$

For a fixed slab orientation, the plane position Xd is optimized so that the length of the shortest straight portion 44 in the grating 16 is equal to zero (0). The position of the symmetry plane 46 is just offset of all the path lengths.

Finally, the slab orientation $\theta_c$ is chosen to minimize $L_0$. $L_0$ is equal to:

$L_0 = l_0 + Rb_0$ (note—$a_0$ is equal to 0 for the first waveguide 30a).

Finally, the slab orientation $\theta_0$ is chosen to minimize $L_0$. $L_0$ is equal to:

$L_0 = l_0 + Rb_0$ (note—$a_0$ is equal to 0 for the first waveguide 30a).

According to the foregoing calculations, the grating 16 starts on the circular interface portion of the input slab 14, ends on the circular interface portion of the output slab 18, has a constant length increment between waveguides 30, and is as small as possible. The gradually increasing counter-clockwise bend is advantageous over the initial straight section of conventional "straight/clockwise bend/straight" configuration. While both configurations lead to a constant increment of travel for the different modes in the grating, the s-shaped configuration partially eliminates the distance that must be traveled by all of the modes. This total decrease in the distance that modes must travel in the grating is beneficial in that cross-talk and other interference significantly decreases as devices and waveguides become shorter.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A phasar comprising:
   an input waveguide;
   an input slab coupled to the input waveguide;
   a waveguide grating, the waveguide grating having a plane of symmetry, the waveguide grating including
      a first waveguide having a length and initial directional angle, the first waveguide including an arcuate portion having an arc length, a first end and a second end, the first end of the arcuate portion being coupled to the slab,
      a plurality of adjacent waveguides, each waveguide having a length and an initial directional angle, each waveguide including
         a first arcuate portion having an arc length, a first end and a second end, the first arcuate portion of each of the plurality of waveguides curving in the same direction as the arcuate portion of the first waveguide, the first end of the first arcuate portion being coupled to the input slab,
         a second arcuate portion having a first end and a second end, the second arcuate portion curving opposite the first arcuate portion, the first end of the second arcuate portion being coupled directly to the second end of the first arcuate portion with essentially no straight waveguide portion therebetween;
         a first straight portion having a length, a first end and a second end, the first end of the first straight portion being coupled to the second end of the second arcuate portion, the second end of the first straight portion lying substantially along the plane of symmetry,
   wherein the waveguides of the waveguide grating have incrementally increasing lengths, with the first waveguide of the waveguide grating having the shortest length.

2. The phasar of claim 1 wherein the first arcuate portions of the plurality of waveguides have incrementally increasing arc lengths.

3. The phasar of claim 1 wherein the arcuate portion of the first waveguide is coupled directly to the input slab, with no waveguide portion therebetween.

4. The phasar of claim 1 wherein the arcuate portion of the first waveguide is coupled to the input slab by a funnel, with no waveguide portion therebetween.

5. The phasar of claim 1 wherein the first arcuate portions of the plurality of waveguides are coupled directly to the input slab with no waveguide portion therebetween.

6. The phasar of claim 1 wherein the first arcuate portion of each of the plurality of waveguides are coupled to the input slab by a funnel, with no waveguide portion therebetween.

7. The phasar of claim 1 wherein the second end of the first waveguide of the waveguide grating lies substantially along the plane of symmetry.

8. The phasar of claim 1 wherein for each waveguide of the plurality of waveguides, the first arcuate portion and the second arcuate portions have substantially equal radii of curvatures.

9. The phasar of claim 1 wherein the first arcuate portion of each waveguide has a first subtended angle, the second arcuate portion of each waveguide has a second subtended angle, and wherein for each waveguide, the sum of the initial directional angle and the first subtended angle is substantially equal to the second subtended angle.

10. The phasar of claim 1 wherein the waveguide grating includes two symmetrical halves, each of said halves having a generally s-shaped configuration.

11. The phasar of claim 1 further comprising an output slab, wherein the first waveguide further includes a second arcuate portion having a first end and a second end, the second arcuate portion curving in the same direction as the arcuate portion, the first end of the second arcuate portion being coupled to the second end of the first arcuate portion, the second end of the second arcuate portion being coupled to the output optical slab, and wherein each waveguide of the plurality of waveguides further includes a second straight portion having a first end and a second end, the first end of the second straight portion being coupled to the second end of the first straight portion;

a third arcuate portion having a first end and a second end, the third arcuate portion curving in the same direction as the second arcuate portion, the first end of the third arcuate portion being coupled to the second end of the second straight portion;

a fourth arcuate portion having a first end and a second end, the fourth arcuate portion curving opposite the third arcuate portion, the first end of the fourth arcuate portion being connected directly to the second end of the third arcuate portion, the second end of the fourth arcuate portion being coupled to the output optical slab.

\* \* \* \* \*